United States Patent [19]

Travis

[11] Patent Number: 4,844,213
[45] Date of Patent: Jul. 4, 1989

[54] ENERGY ABSORPTION SYSTEM

[76] Inventor: William B. Travis, 10021 Caribou Trail, Dallas, Tex. 75238

[21] Appl. No.: 102,356

[22] Filed: Sep. 29, 1987

[51] Int. Cl.$^4$ ............................ E01F 15/00; F16F 7/12
[52] U.S. Cl. ........................................ 188/377; 188/371; 188/372; 188/376; 256/13.1; 293/132; 405/212
[58] Field of Search ............... 256/13.1; 404/6, 7; 114/219; 188/129, 2 R, 271, 387, 377; 293/132; 52/121; 405/212; 248/589, 580, 581

[56] References Cited

U.S. PATENT DOCUMENTS

| | | | |
|---|---|---|---|
| 533,009 | 1/1895 | Holland et al. | 248/580 |
| 2,213,738 | 9/1940 | Larsen | 248/350 |
| 2,615,535 | 10/1952 | Snyder | 188/129 |
| 2,740,504 | 4/1956 | Bailey | 189/14 |
| 3,139,957 | 7/1964 | Fuller | 189/1 |
| 3,204,911 | 9/1965 | Lawrence | 248/358 |
| 3,213,574 | 10/1965 | Melbye | 52/121 |
| 3,248,831 | 5/1966 | Jones | 52/121 |
| 3,328,921 | 7/1967 | Keslin | 52/121 |
| 3,495,370 | 2/1970 | Habro | 52/632 |
| 3,592,422 | 7/1971 | Norman | 248/18 |
| 3,680,662 | 8/1972 | Walker | 188/1 B |
| 3,845,936 | 11/1974 | Boedecker, Jr. | 256/1 |
| 3,866,366 | 2/1975 | Fuller | 52/81 |
| 3,924,830 | 12/1975 | Collard et al. | 248/581 |
| 3,977,140 | 8/1976 | Matsudaira | 52/167 |
| 4,008,669 | 2/1977 | Sumrell | 105/484 |
| 4,066,244 | 1/1978 | Yoho | 256/1 |
| 4,073,101 | 2/1978 | Yoshida | 52/79 |
| 4,074,476 | 2/1978 | Ordorika | 52/79 |
| 4,407,484 | 10/1983 | Meinzer | 256/13.1 |
| 4,452,431 | 6/1984 | Stephens | 256/13.1 |
| 4,539,927 | 9/1985 | Foresman | 114/89 |
| 4,642,948 | 2/1987 | Travis | 52/79 |
| 4,657,116 | 4/1987 | Gardner et al. | 405/212 |

FOREIGN PATENT DOCUMENTS

| | | |
|---|---|---|
| 485086 | 3/1970 | Switzerland . |
| 312808 | 6/1929 | United Kingdom . |
| 1107309 | 3/1968 | United Kingdom . |

Primary Examiner—Andres Kashnikow
Assistant Examiner—Mark T. Le
Attorney, Agent, or Firm—Richards, Harris, Medlock & Andrews

[57] ABSTRACT

Several embodiments (10, 30, 80) of an energy absorption system are designed for permitting progressive collapse of the system by absorbing energy within the system. In one embodiment, a system (10) comprises conical bodies (12) separated by cables (20), which system progressively collapses through plastic deformation of compression members (16) cooperating with each cable (20). In another embodiment, a system (30) incorporates plastically collapsible compression members (44, 46, 48) which collapse progressively to permit the bodies (32) to move together. In another embodiment, a system (80) is provided where the progressive collapse is permitted by frictional sliding of a securing device (92) along a track (90) which permits bodies (82) to move together.

7 Claims, 2 Drawing Sheets

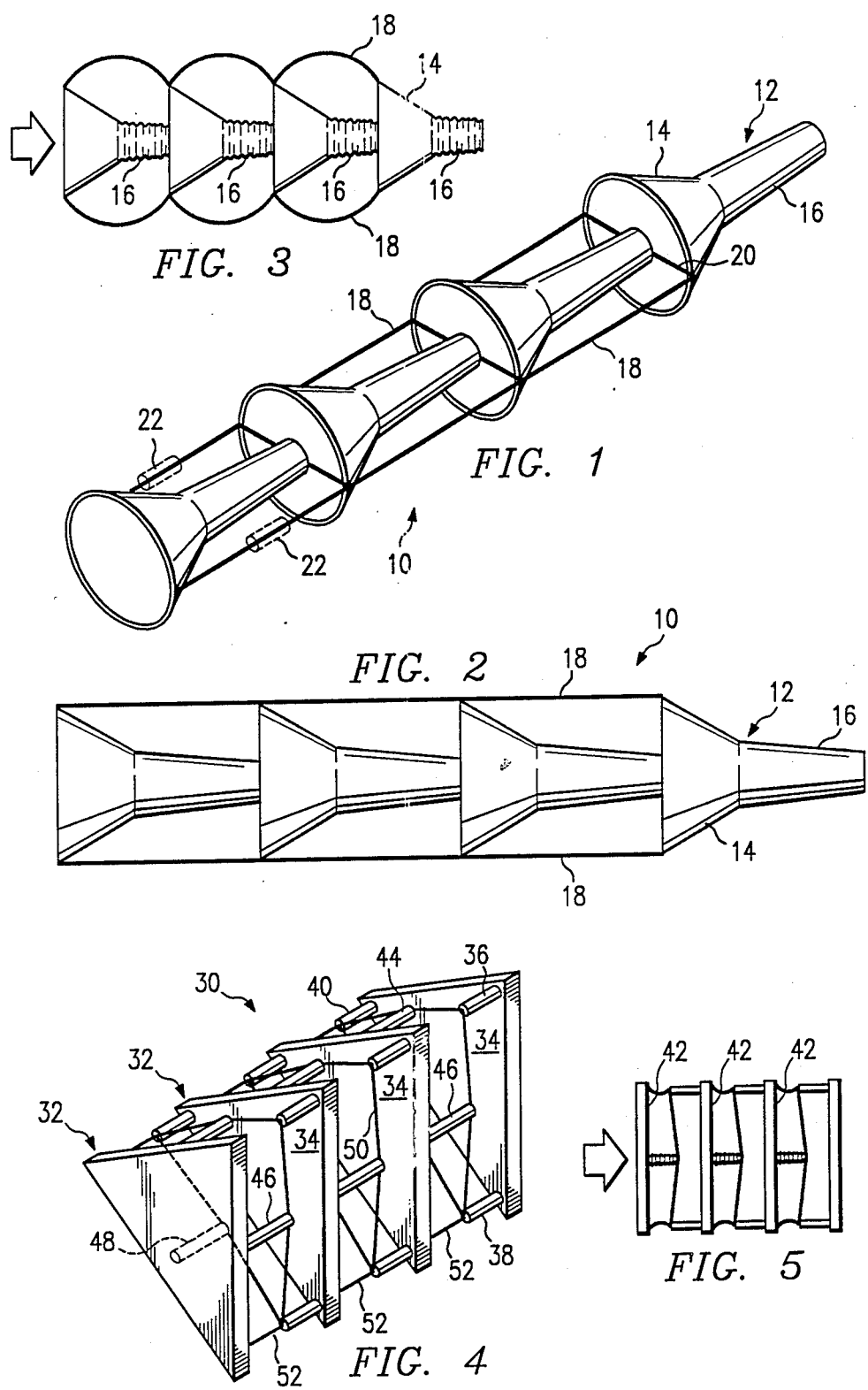

4,844,213

ENERGY ABSORPTION SYSTEM

TECHNICAL FIELD

This invention relates to a system for energy absorption by a progressive failure of elements.

BACKGROUND ART

Many applications can be found for an energy absorbing system. For example, many highways have energy absorbing systems formed by 55 gallon drums positioned for a concrete abutment. If a car rams the barrels, the barrels will deform and absorb the kinetic energy of the automobile, slowing the automobile with a much lesser value of deceleration to reduce the potential for bodily injury.

There is an ongoing need for improved energy absorption systems which are more efficient in absorbing energy, cost less, and are easy to install.

SUMMARY OF THE INVENTION

In accordance with one aspect of the present invention, an energy absorption system is provided. The system includes first and second bodies positioned proximate each other. A first flexible tension bearing means is connected between first and second points of the first member. A projecting compressive member joined to the second body is mated to the first tension bearing means between the first and second points and is directed toward the first body for deflecting the first tension bearing means toward the first body whereby a tension force is applied to the first tension bearing member and a compressive force is applied to the compressive member to oppose a force acting to move the first and second members together. A second flexible tension bearing means is connected between the first and second bodies for carrying a tension force to oppose forces acting to move the first and second bodies apart. Structure is provided for progressively permitting the first and second bodies to move together while absorbing energy.

BRIEF DESCRIPTION OF THE DRAWINGS

For a more complete understanding of the present invention and the advantages thereof, reference is now made to the following description taken in conjunction with the accompanying drawings in which:

FIG. 1 is a perspective view of a first embodiment of the present invention in the expanded position;

FIG. 2 is a side view of the embodiment of FIG. 1;

FIG. 3 is a side view of the embodiment of FIG. 1 shown collapsed after absorbing energy;

FIG. 4 illustrates a second embodiment of the present invention in the expanded state;

FIG. 5 illustrates the embodiment of FIG. 4 in the collapsed state having absorbed energy;

DETAILED DESCRIPTION OF THE INVENTION

Figures 6A, 6B:
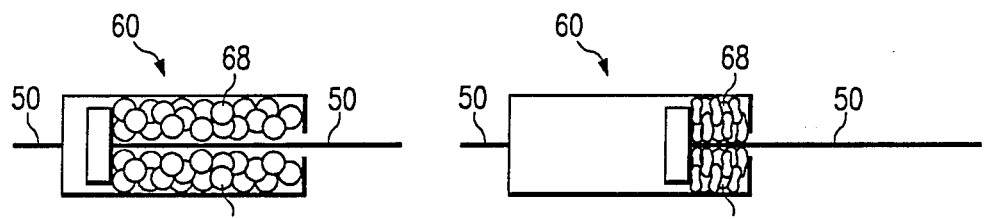
FIG. 6A and 6B illustrate a first modification of the embodiment of FIG. 4.

Referring now to FIGS. 1-3, there is illustrated an energy absorption system 10 forming a first embodiment of the present invention. The system includes a plurality of conical bodies 12 which are stacked end to end. Each of the conical members includes a conical base 14 and a collapsible compression member 16. A pair of cables 18 extend between the bases of adjacent conical bodies 12 to prevent the bodies from moving apart. As can be seen, cables 18 are secured at the rim of base 14 distant from the members 16. A cable 20 extends between opposite sides of each conical base 14 over the collapsible compression member 16 of the adjacent body to prevent the bodies from moving together. Preferably, when assembled in the extended position as seen in FIGS. 1 and 2, the cables 18 and 20 are under a considerable tension to hold the system rigid. This tension can be induced by precisely setting the length of the cables, or can be induced by any other means, such as turn buckles 22 mounted in either or both cable sets.

As an alternative to the use of a single cable 20 between adjacent bodies, the single cable 20 can be substituted for by a set of cables 20, each cable secured at one end to a point on the conical base 14 and passing through the hollow interior of the collapsible compression member 16 of the adjacent body to another mounting point, such as the base of the adjacent body.

With reference to FIG. 3, if an impact or force is exerted on system 10 in the direction parallel to the extent of the cables 18 and compression members 16, the compression members 16 will progressively collapse in plastic deformation, absorbing the energy applied to the system. As clearly evident from FIG. 3, the collapse of the compression member 16 will slacken the cables 18. However, the tension in cables 20 will increase in order to provide the transfer of forces between the bodies sufficient to collapse the members 16.

With reference now to FIGS. 4 and 5, a second embodiment of the present invention is illustrated as energy absorption system 30. The system includes a series of triangularly shaped bodies 32 which are positioned side by side. The upper side 34 of each of the bodies mounts upstanding cylindrical compression members 36, 38 and 40 at its corners. The lower side 42 of each body has downwardly extending compression members 44, 46 and 48 extending downwardly from a position approximately midway between the corners along each edge of the body. A cable 50 is secured between adjacent upstanding compression members. The downwardly extending compression member of the adjacent body between the upstanding compression members contacts the cable 50 extending between the upstanding compression members about midway between the upstanding compression members to resist a force tending to move the bodies together. Tension bearing cables 52 extend between the outermost end of each upstanding compression member and the lower side of the adjacent body at the facing corner. Cables 52 resist movement of the bodies apart.

With reference to FIG. 5, the downwardly extending compression members 44, 46 and 48 are all progressively collapsible in a direction corresponding to their length. Thus, when a force is exerted on the bodies 32 in a direction parallel the length of the downwardly extending compression members and cables 52, the system will progressively collapse through plastic deformation of the downwardly extending compression members 44, 46 and 48 to absorb the energy.

With reference to FIGS. 6A and 6B, a first modification of the energy absorption system 30 is illustrated. In the first modification, the compression members 44, 46 and 48 are not progressively collapsible. Instead, an energy absorbing element 60 forms a portion of each cable 50. The element 60 permits a progressive lengthening of each cable 50 for a progressive collapse of the system 30 with absorption of energy within the elements 60. For example, element 60 can include a cylinder 62 which is rigidly secured to one portion of cable 50 and has an opening 64 at the other end of the cylinder. The other portion of cable 50 is attached to a plate 66 within the cylinder 62 and passes through the opening 64. Crushable material 68 fills the cylinder 62 between the plate 66 and the end of the cylinder containing opening 64. The material 68 is preferably selected to resist any collapse until a predetermined tension is placed on the cable 50. If this tension is exceeded, the material then plastically deforms or crushes to permit plate 66 to move toward the end of the cylinder 62 with opening 64 to effectively lengthen the cable, permitting the bodies 32 to move toward each other and collapse the system 30 as seen in FIG. 6B. The plastic deformation of material 68 absorbs the energy exerted to collapse the system 30.

Alternatively, material 68 can be a resilient rubber-like material, which compresses when a force is applied, but rebound to its original state after the force is removed.

Figures 7, 8:
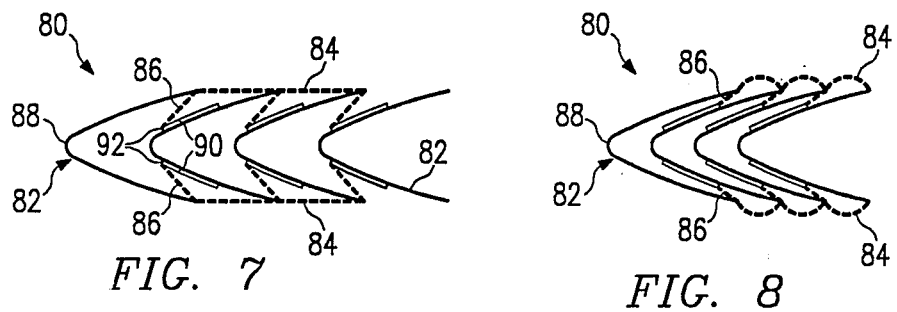
FIG. 7 illustrates a third embodiment of the present invention in the expanded position.
FIG. 8 illustrates the embodiment of FIG. 7 in the collapsed position having absorbed energy.

With reference now to FIGS. 7 and 8, a third embodiment of the present invention is illustrated as an energy absorption system 80. The system 80 includes a series of stacked bodies 82 which have a U-shaped configuration. Cables 84 extend between the leg portions of adjacent bodies 82 to limit the separation of the bodies. Cables 86 extend between the legs of each body and the nose 88 of the adjacent body. The cables 86 are fixed to the legs in a rigid manner. However, the ends of cables 86 on the nose 88 are bolted onto a track 90 extending for some distance from the nose 88 of each body toward its respective leg. The securing device 92 securing the cable 86 to each track 90 permits frictional sliding of the device 92 along the track 90. Nose 88 of each body 82 acts as a projecting compression member to permit cables 86 to be in tension.

If sufficient forces are exerted on the system 80 in a direction parallel cables 84, the securing devices 92 will slide along the tracks 90, permitting the bodies 82 to move closer together in a progressive collapse of the system 80 with the energy being absorbed in frictional sliding of the securing devices 92 along their respective tracks 90. In this embodiment, the system 80 can again be extended by simply moving the securing devices 92 back to the original position on tracks 90 and reused. In one embodiment constructed in accordance with the teachings of system 80, the legs could be separated by a distance of about 6 feet with the height of the bodies being about 30 inches. Such a construction would be suitable for use as road barriers.

Figure 9:
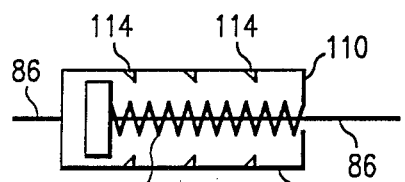
FIG. 9 illustrates a structure for absorbing energy.
Figure 10:
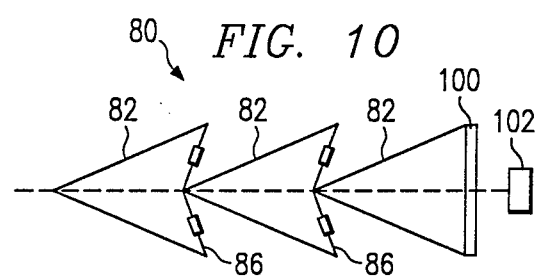
FIG. 10 is a top view of the third embodiment of the present invention associated with a braking cable.
Figure 11:
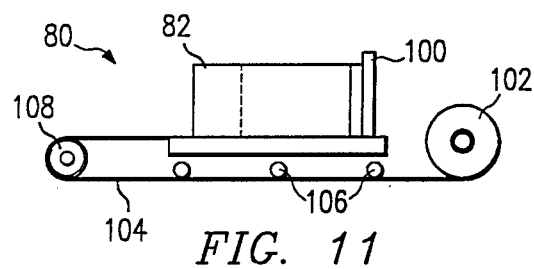
FIG. 11 is a side view of the device shown in FIG. 10.

With reference now to FIGS. 9-11, a variation of the energy absorption system 80 is illustrated. A rigid support 100 is secured to the last body 82 to provide support for the system. Further, a cable winch 102 is mounted immediately behind the rigid support and contains a cable 104. Cable 104 extends from the winch 102, along underground rollers 106 and pulley 108 to attach to the forwardmost body 82. The winch 102 will rotate to pay out cable 104, but is provided with a preset braking force to resist the cable pay out. Thus, if the forward body is impacted, as by a vehicle, as the bodies collapse against the support 100, cable 104 will pay off of the winch to assist in converting the kinetic energy of the system into heat or the like.

Further, the cables 86 between each body can be provided with an energy absorbing element 110 as seen in FIG. 9. One section of the cable 86 is secured to casing 112. Within the hollow interior of casing 112 is a series of ratchet teeth 114 and a spring 116. The other end of the cable 86 is connected to a plate 118 which lies within the casing 112 and is urged against the backwall of the casing by the spring 116. If the energy absorption system 80 is impacted, the cables 86 will come under tension, causing the spring 116 to compress, and plate 118 to ratchet along teeth 114. The tension in the cable will determine the extent of compression in the spring, and the spring will be held in this compressed state by the plate 118 engaging teeth 114. Thus, the kinetic energy represented by the tension in cable 86 is translated into potential energy in the compressed spring.

In regard to the energy absorption system 80, it will be understood that the bodies 82 lie on a surface, such as the ground. The frictional engagement between the bodies and the surface also provides a mechanism to dissipate the kinetic energy during impact. As the bodies 82 slide along the surface, friction generates heat, dissipating the kinetic energy.

Figure 12:
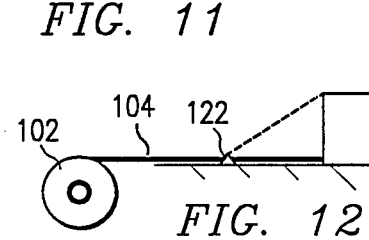
FIG. 12 is a side view of a modification of the device shown in FIG. 10.

FIG. 12 illustrates a modification of the system 80 illustrated in FIGS. 10 and 11. In FIG. 12, the winch 102 is buried underground in front of the energy absorption system 80. Thus, the use of rollers 106 and pulley 108 can be eliminated. Also, a tie down cable 120 can be secured to anchors 122 in the ground at opposite ends of the system 80 and extends across the top of the system 80 to prevent the bodies from jumping upward under impact out of contact with the ground.

Although several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope of the invention.

I claim:

1. An energy absorption system, comprising:
   a first body;
   a second body;
   a first flexible tension bearing means connected between first and second points of said first body;
   a projecting compression member forming part of said second body and mated to said first tension bearing means between said first and second points and directed toward said first body for deflecting said first tension bearing means toward said first body whereby a tension force is applied to said first tension bearing member and a compression force is applied to said compression member to oppose movement of said first and second members together;
   a second flexible tension bearing means connected between said first and second bodies for carrying a tension force to oppose movement of said first and second bodies apart; and means for progressively permitting the first and second bodies to move together while absorbing energy to form an energy absorption system, the energy absorbed being converted to a form so that the absorbed energy does not contribute to movement of the first and second bodies apart.

2. The system of claim 1 wherein said first and second tension bearing means are cables.

3. The system of claim 1 wherein said means for progressively permitting the first and second bodies to move together is formed by said projecting compression member which collapses in plastic deformation.

4. The system of claim 2 further comprising means for tensioning at least one of said cables.

5. The system of claim 2 wherein said means for absorbing energy is an energy absorbing element forming a portion of said first flexible tension bearing cable.

6. The apparatus of claim 1 wherein said means for progressively permitting the first and second bodies to move together is a frictional engagement between said first flexible tension bearing means and one of said bodies which permits the bodies to move together while dissipating energy through friction.

7. An energy absorption system, comprising:
a first body having a U-shaped configuration and a nose and leg portions;
a second body having a U-shaped configuration and a nose and leg portions;
at least one first cable extending between the legs of said first body and the nose of said second body;
means for securing an end of said first cable to said nose of said second body permitting frictional sliding motion of the cable end along the nose; and
at least one second cable extending between the leg portions of said first and second bodies to limit the separation of the bodies; and
progressive movement of the first and second bodies together causing said first cable end to move along the nose of said second body to dissipate energy through friction.

* * * * *